United States Patent
Nurmi et al.

(10) Patent No.: US 6,821,535 B2
(45) Date of Patent: Nov. 23, 2004

(54) PROCESS FOR HARD PANNING OF CHEWABLE CORES AND CORES PRODUCED BY THE PROCESS

(75) Inventors: Juha Nurmi, Kirkkonummi (FI); Tammy Pepper, Weybridge Surrey (GB); Juha Oravainen, Jokioinen (FI); Mike Bond, Surrey (GB); Ian Fairs, Surrey (GB)

(73) Assignee: Xyrofin Oy, Espoo (FI)

( * ) Notice: Subject to any disclaimer, the term of this patent is extended or adjusted under 35 U.S.C. 154(b) by 112 days.

(21) Appl. No.: 09/776,075

(22) Filed: Feb. 2, 2001

(65) Prior Publication Data

US 2001/0018084 A1 Aug. 30, 2001

(30) Foreign Application Priority Data

Feb. 3, 2000 (FI) .............................. 20000226

(51) Int. Cl.[7] .............................. A23P 1/02; A23P 1/08
(52) U.S. Cl. .......................... 426/5; 426/285; 426/304; 426/305; 426/658
(58) Field of Search .............................. 426/5, 89, 103, 426/285, 302, 303, 304, 305, 306, 658, 660, 273

(56) References Cited

U.S. PATENT DOCUMENTS

| | | |
|---|---|---|
| 4,423,086 A | 12/1983 | Devos et al. |
| 4,631,129 A | 12/1986 | Heikkila |
| 4,681,935 A | 7/1987 | Forss et al. |
| 4,753,790 A | 6/1988 | Silva et al. |
| 4,840,797 A | 6/1989 | Boursier |
| 5,017,400 A | 5/1991 | Olinger et al. |
| 5,063,080 A | 11/1991 | Kruger et al. |
| 5,081,026 A | 1/1992 | Heikkila et al. |
| 5,084,104 A | 1/1992 | Heikkila et al. |
| 5,098,730 A | 3/1992 | Pepper et al. |
| 5,144,024 A | 9/1992 | Pepper et al. |
| 5,204,115 A | 4/1993 | Olinger et al. |
| 5,248,508 A | 9/1993 | Reed et al. |
| 5,270,061 A | 12/1993 | Reed et al. |
| 5,376,389 A | 12/1994 | Reed et al. |
| 5,478,593 A * | 12/1995 | Serpelloni et al. ......... 427/2.14 |
| 5,536,511 A | 7/1996 | Yatka |
| 5,536,526 A | 7/1996 | Virtanen et al. |
| 5,616,361 A | 4/1997 | Virtanen et al. |
| 5,631,150 A | 5/1997 | Harkki et al. |
| 5,637,225 A | 6/1997 | Heikkila et al. |
| 5,730,877 A | 3/1998 | Heikkila et al. |
| 5,866,382 A | 2/1999 | Hallborn et al. |
| 5,932,452 A | 8/1999 | Mustranta et al. |
| 5,951,777 A | 9/1999 | Nurmi et al. |
| 5,980,640 A | 11/1999 | Nurmi et al. |
| 5,998,607 A | 12/1999 | Heikkila et al. |
| 6,086,681 A | 7/2000 | Lindroos et al. |
| 6,224,776 B1 | 5/2001 | Heikkila et al. |
| 6,239,274 B1 | 5/2001 | Heikkila et al. |
| 6,262,318 B1 | 7/2001 | Heikkila et al. |
| 6,271,007 B1 | 8/2001 | Apajalahti et al. |
| 6,365,203 B2 * | 4/2002 | Degady et al. ................. 426/5 |

FOREIGN PATENT DOCUMENTS

| | | |
|---|---|---|
| EP | 0 105 394 A3 | 4/1984 |
| EP | 0 813 817 A2 | 12/1997 |
| FI | 68763 | 7/1985 |

OTHER PUBLICATIONS

Edwards, W.P., "The Science of Sugar Confectionary", (2000), The Royal Society of Chemistry, Chapter 8 pp. 95–100.

* cited by examiner

Primary Examiner—Keith Hendricks
(74) Attorney, Agent, or Firm—Scully, Scott, Murphy & Presser

(57) ABSTRACT

The invention relates to a process for the hard panning of chewable cores in a pan or drum wherein a syrup of a crystallizable sugar or polyol is intermittently sprayed over a bed of the cores and the cores are dried between sprayings with a flow of air. The speed and efficiency of the panning process is increased by controlling the drying of the cores between sprayings by controlling parameters of the drying air in such a way as to intentionally leave a substantial residual moisture in the drying coating layer at the start of a subsequent spraying phase. The chewable products are preferably xylitol coated chewing gums.

28 Claims, No Drawings

PROCESS FOR HARD PANNING OF CHEWABLE CORES AND CORES PRODUCED BY THE PROCESS

The present invention relates to a process for the hard panning of chewable cores in a rotary pan wherein a syrup containing crystallizable sugar(s) and/or polyol(s) such as xylitol is intermittently sprayed over a bed of the cores and the cores are dried between sprayings with a flow of air. The invention relates especially to the improved control of the panning process which enables a faster panning and thereby a considerable saving in the time required for providing cores with hard coatings. The invention also relates to cores panned by a process according to the invention and especially to chewing gums coated with a hard coating of xylitol.

The art of coating or panning is described generally e.g. in the article "Crystallisation and drying during hard panning" by Dr. Richard W. Hartel (Manufacturing Confectioner, February 1995). According to the document too fast drying causes problems and for proper results it is important that the crystallization and drying are in balance. Crystallization and drying should proceed at the same speed so that each layer is set before the next layer is sprayed on. If drying is too rapid, a rubbery skin is formed on the surface trapping the water in the layers below.

Consequently, the panning technology has provided long drying times to allow the crystallization to proceed properly in the layer. On the other hand long drying times increase the cost of panning. With compounds such as xylitol and sorbitol, the solubility and viscosity of the compound require low -temperature panning (see "Coating with sorbitol. A Comparison of properties of sorbitol-mannitol other polyols and sugars" by Francis Devos, Roquette Freres, Manufacturing Confectioner, November 1980).

The panning or coating with xylitol and other polyols is described also in the following patent publications:

U.S. Pat. No. 4,423,086 (Devos, assigned to Roquette Freres)
U.S. Pat. No. 4,753,790 (Silva, assigned to Warner-Lambert Company)
U.S. Pat. No. 4,840,797 (Bousier, assigned to Roquette Freres)
U.S. Pat. No. 5,248,508 (Reed et al, assigned to Wm. Wrigley Jr.)
U.S. Pat. No. 5,270,061 (Reed et al, assigned to Wm. Wrigley Jr.)
U.S. Pat. No. 5,376,389 (Reed et al, assigned to Wm. Wrigley Jr.)
U.S. Pat. No. 5,536,511 (Yatka, assignee Wm. Wrigley)
EP 813 817 (Cerestar Holding)

In these patents various panning techniques with polyols such as sorbitol, xylitol and mannitol are discussed. In many cases the coating is regarded as being complex, slow and costly. This concerns especially xylitol.

Xylitol is rather broadly used in non-cariogenic chewing gums, confectionery and pharmaceuticals. For proper panning a fairly low temperature, such as 20 to 25° C. is used and care is taken to dry the cores properly between sprayings. This provides a good and hard coating but requires long process times. If the panning procedures could be speeded up, the capacity of the equipment could be increased and cost savings could be obtained. Thus, there exists a need for a quicker and more efficient coating process for polyols such as xylitol, and also for other coating compounds.

It has been found that most of the heat needed for the drying during panning derives from the drying air, and that only a minor part comes from the heat of crystallization. Thus, it is possible to control the panning procedure by controlling the drying conditions.

The present invention seeks to provide improvements in panning procedures to alleviate the problems discussed above and to provide a product with equal or improved quality and shelf-life. The present invention has been worked out primarily with xylitol but in its broadest sense it is applicable also to panning with other polyols and for the control of panning with sugars.

The present invention is defined in the appended claims which are incorporated herein by reference.

Thus, the present invention relates to a process for the production of chewable coated cores by hard panning of chewable cores in a coating pan or drum wherein a syrup containing crystallizable polyol(s) and/or sugar(s) is intermittently sprayed over a rotating bed of the cores and the cores are dried between sprayings with a flow of air. The invention is characterized in that the drying of the cores between sprayings is controlled by controlling parameters of the drying air in such a way as to intentionally leave a substantial residual moisture in the drying coating layer at the start of a subsequent spraying phase.

The term "substantial residual moisture" as used throughout this specification and claims is intended to mean a moisture which is substantially higher than the moisture left in the coating layer in conventional panning procedures. In conventional panning it is considered necessary to dry the sprayed coating layer to a fully dry condition before the next layer is sprayed. It is also considered necessary to perform the drying slowly so that the crystallization and drying are in balance. A moist and/or improperly crystallized layer is considered to provide a very poor product. Thus, a normal coating is performed slowly and does not stop until the drying is substantially complete to avoid having sticky cores which adhere to each other. On the other hand a good panner also knows that the drying should not continue for too long since then the cores will become brittle and will start to produce dust which impairs the surface of the coating.

When a new process is developed in practice the level of dryness of the cores is tested manually. The door of the panning apparatus is opened and the feel of the cores is tested by hand. An experienced panner will know the feel of the cores when they have reached the correct fully dry condition.

The drying of the cores may also be monitored by measuring the humidity in the bed or in the drum or the humidity of the outlet air. The drying is complete when the humidity does not change anymore and its gradient reaches a plateau.

In the present invention the control is preferably made by monitoring the relative humidity of the outlet air. The drying would be complete by conventional standards when the relative humidity gradient has reached a plateau. This plateau indicates what in the specification and claims is called the "basic level". This basic level is the humidity level that the conventional panning would aim at. In the present invention the drying is stopped before the humidity reaches its basic level and its gradient flattens out to a plateau. Thus, compared to the conventional technique, a residual moisture is intentionally left in the cores. This may be seen in that the air is still effectively although slowly removing moisture from the cores and the humidity of the outlet air keeps decreasing.

The present invention is based on the realization that it is not necessary to dry the cores completely. The critical maximum level of residual moisture or rather the critical minimum level of dryness that must be reached is the level where the outer surface of the cores is completely dry. At the point when the outer "skin" of the last sprayed layer is dry, the layer underneath it still contains a substantial amount of its moisture. This residual moisture has in the prior art been substantially completely removed and drying has continued until all of the syrup has crystallized or at least solidified. Removing this moisture is slow and hence it stows down the whole process.

In the present invention a substantial amount of residual moisture is left in the core. Surprisingly this does not cause the expected problems in the final product provided that the drying is controlled by parameters of the drying air.

The drying air parameters are preferably selected from air humidity, air temperature, air flow speed, air flow time and- air flow direction. A combination of two or more of the parameters may be required to provide the desired control. In a preferred embodiment of the invention the drying is performed with air having a higher temperature than what has been conventionally used and the residual moisture is retained in the core layer by stopping the blowing of drying air to the bed of cores before the relative humidity of the drying air indicates total drying of the coating. Thus, control of the drying time is based on the relative humidity of the outlet air from the pan. The spraying starts immediately after the drying air flow has stopped.

The control may also be performed by adjusting the temperature and/or the humidity and the flow time of the inlet air, or by some other combination of parameters, which is well understood by those skilled in the art.

The "substantial" amount of moisture left in the layer will differ with different coating compounds and different conditions. The limit of moisture retained in the layer and the trigger point at which the next spraying should start may be worked out and optimized by tests which are well within the competence of those skilled in the art. The cores or pellets may, for instance, be checked visually and by feel to ascertain that the outer "skin" of the last layer is dry. However, the preferred method according to the invention is to monitor the outlet air relative humidity. The relative humidity should be at least 1% higher than conventional. Even this small residual moisture may speed up the process considerably since the drying at the end is so slow. In a preferred embodiment of the invention the relative humidity at the start up of the next spraying phase is more than 3% and preferably 5–10% higher than the conventional value.

The polyols which are useful for panning according to the present invention are crystallizable polyols which are conventionally used for providing a hard coating on cores. The polyols are especially selected from xylitol, sorbitol, maltitol, isomalt, mannitol or mixtures thereof. The term isomalt is intended to cover both isomalt and its separate crystallizable components. The preferred polyol is xylitol. The sugar useful in the present invention is a crystallizable sugar useful as a hard coating. Usually the sugar would be selected from saccharose, fructose and glucose.

In a preferred aspect, the present invention concerns a process for the hard panning of chewable cores in a rotary pan wherein a syrup of a polyol such as xylitol syrup is intermittently sprayed over a bed of the cores and the cores are dried between sprayings with a flow of air.

In conventional panning with polyols the drying air temperature is generally close to ambient temperatures which makes the coating procedure slow but allows crystallization to proceed properly in the coating layer. In the present invention it is a preferred feature to use elevated temperatures. This speeds up the drying which is acceptable since proper crystallization of the whole layer is not aimed at. The temperature of the bed should be raised but it must not be elevated above the temperature at which the cores in the bed will melt or deteriorate. Another critical limit for the elevated temperature is provided by the melting point of the coating compound.

In a preferred coating procedure using a polyol such as xylitol, the temperature of the bed of chewable cores is raised to a temperature above 25° C. The temperature of the bed may be raised to 45° C., preferably between 30 and 40° C., for at least a part of the total coating procedure. The drying during this part of the procedure is performed with air having a temperature above 25° C. The temperature of the inlet air may be raised to 75° C., preferably to between 30 and 65° C.

The present invention provides a chewable core panned by a process as defined above. The core is preferably a chewing gum coated with a hard coating of xylitol. The present invention makes the coating process quicker and more efficient and still produces a product with a comparable or better crunch and shelf-life.

In the preferred embodiment of the invention a controlled process is provided wherein the conventional drying air temperature (about 20 to 25° C.) is raised to a higher temperature. Using a high temperature in the panning with a polyol such as xylitol was clearly against the judgement of the person skilled in the art However, it has surprisingly been found that with proper control of the drying parameter, the high temperature panning results in good quality cores while the process time are reduced as much as 40% from the standard procedure. In tests performed it was noted that the coating quality was very good. The coating and core crunch was comparable to standard cores and the cores had a good shelf-life.

In the preferred embodiment of the invention the bed temperature is raised and the drying process is controlled by the relative humidity of the outlet air. The drying times can be significantly shortened with the higher temperature drying, and set times can be obtained from the measured relative humidity values.

The present invention will now be described in greater detail with reference to some practical examples. The description is primarily made with reference to xylitol as the coating syrup but it is evident that the control principles are applicable also to panning with other polyols and sugars.

In conventional panning processes a balance between crystallization and drying is considered a prerequisite for achieving a proper results. According to the present invention that balance is not the desired result. Instead the target is an optimum intermediate product for which good crunchiness can be obtained in the final product. By utilizing the invention more benefits from the special solubility, viscosity and crystallization properties of xylitol and other crystallizable polyols and sugars can be gained. It has been found that high bed temperatures preferably 30 to 40 instead of the conventional 20 to 25° C. in combination with leaving the coating surface in a slightly moist condition shorten the coating process significantly.

In a preferred embodiment of the panning process, the first coating cycles are performed at normal temperature (about 20 to 25° C.) to make good start up. Thereafter the temperature is raised and then most of the cycles are performed with hot drying air, and, preferably, the final coating steps are again performed at normal temperature to provide typical post treatment conditions. The high temperature drying period is preferably controlled by monitoring the outlet air humidity.

In a conventional panning procedure the drying is not considered completed until the syrup sprayed onto the cores has dried totally. This means that the outlet air humidity, which rises as the drying air drives off moisture from the wetted cores in the bed, is back at the basic level. Any drying performed after the humidity in the outlet air is below the basic humidity level is superfluous and only impairs the product. Overdrying causes an increased dusting and the product quality is lowered.

According to the preferred drying of the present invention the drying is stopped before the relative humidity of the drying air has reached its basic level. The basic level of the relative humidity (RH) of the outlet air means the RH at its lowest point i.e. the level where the RH gradient has reached a plateau. During a drying phase the RH of the outlet air quickly rises as the air gathers moisture from the cores. Then the RH starts slowly to decrease as less moisture is left in the core surfaces. The slope of the decreasing RH curve flattens out towards the end of the drying pause. Drying is quick at the start and slow towards the end. In the present invention the conventional end point is not reached. The next spraying is started before the cores have been fully dried out. Although the amount of moisture left is not large, the cutting off of the drying saves a lot of time since the drying is slow at this point. At elevated temperatures the drying is faster due to the elevated bed temperature.

According to the invention the drying is stopped and the next spraying is started when the relative humidity of the outlet air is 1 to 10 percentages higher, preferably 4 to 8 percentages higher than that of the basic level. It is especially preferred to start the next spraying when the RH of the outlet air is more than 3% higher than the basic level. Very good results have been observed with an RH of about 5% higher RH values and an elevated temperature of the drying air. Stopping the drying at this point means that an amount of moisture is intentionally left in the coating. The conventional balance between drying and crystallization is not achieved. By leaving some moisture in the coating the later crystallization of the xylitol is surprisingly improved and the crunch and quality of the product after tempering is improved.

It should be noted that both the quick drying provided by the residual moisture and the high temperature in the coating are contrary to normal panning principles.

The cores may be coated in any conventional coating apparatus. The cores normally rotate in a coating bed. Coating solution is fed in cycles to the coating apparatus. The coating apparatus rotate essentially all the coating time. The target is to get chewing gum having smooth coating layers of a sufficient thickness. Thus, up to 100 or more cycles can be applied. Normally about 50 to 60 cycles are applied for chewing gums.

A conventional coating process is made in cycles which include (i) a syrup spraying phase; (ii) a rotating phase without spraying (i.e. a pause); and (iii) an air drying phase. Sometimes, however, the pause is left out.

In a coating cycle a syrup containing polyol or sugar is sprayed on a rotating bed of cores to be coated. Basically as much as possible syrup is sprayed, but if too much is added the cores tend to adhere to each other. During the rotation phase or pause the syrup spreads uniformly on the pellets or cores. During the pause the drying air flow is often maintained but the bed is by-passed so that no air flow contacts the bed. During spraying the air flow may be maintained or by-passed. In the drying phase the drying air is supplied to the bed.

The drying air is normally dried before use by cooling it below its dew point so as to remove moisture. Then the dry air is generally heated to the desired temperature.

The core material of most chewing gums or the like heat sensitive material does not tolerate too high drying temperatures. Therefore, it is preferred in the practice of the invention to use in the first cycles drying air with a standard ambient temperature to create "protective" layers on the cores. After the protecting layers are formed the temperature of the drying air is raised and the higher air temperature gradually raises also the bed temperature.

Based on trials performed in practice, it seems that 30 to 40° C. is an optimum bed temperature for producing a good quality xylitol coating. Temperatures above 40° C., although providing a rapid drying and hardly any sticky surfaces, may cause other problems such as the gum pellet softening or distorting.

By using a high drying temperature a sensitive and demanding process is created. However, the residual moisture which is intentionally left in the coating serves to protect the cores from the high temperature. According to the invention, the process is controlled by monitoring drying air parameters which control the residual moisture. It is especially preferred to control the outlet air humidity (moisture concentration of the outlet air), the air flow rate or time, and/or the speed or direction of the air.

In the beginning of the drying phase the moisture content of the outlet air increases rapidly and then starts to decrease. Towards the end of the phase the decrease in humidity becomes slower and the removal of the moisture from the layer is minor—the rest of the water is more difficult to remove from the layer. According to the invention the drying phase is stopped before the drying is completed. When a suitable humidity is reached the drying is interrupted.

From practical trials it can be seen that the application of the next syrup cycle prior to complete drying of the pellets has improved coating times for the procedure. The differential between the basic RH and the trigger point for syrup application is preferably between 1–10 percentages. The actual value needs to be varied depending on the bed temperature and the inlet air RH. At higher inlet air humidities the difference between basic and trigger point RH should be smaller. The desire is to ascertain that there is residual moisture in the coating. The efficiency of the drying air improves as the RH of the inlet air is lowered and the difference between trigger point RH and basic level can be increased.

It has been found that the dusting problem which has previously prevented utilization of higher drying temperatures is alleviated by parameters of the drying air. Thus, the relative humidity of the drying air at the outlet is preferably monitored and the drying air is stopped slightly before the layer is fully dried out.

Another separate or supplementary procedure for improving the drying is to blow the drying air in a direct flow (with the air flowing from above the bed through the product) instead of the conventional reverse flow (from below the bed through the product). This measure reduces dusting and provides an improved quality product. The flow rate (speed and/or time) of the drying air can also be used to control the drying of the layer.

The suitable time for applying the drying air depends on the apparatus used. When suitable parameters are once found, the apparatus can be adjusted to work accordingly.

After the drying phase the next cycle continues with a new spraying phase, rotating phase and drying phase. In the final cycles conventional (lower) drying temperatures are preferably used and the air flow may be changed to reverse flow. Coating cycles (usually about 60 cycles) are applied until a suitable coating is obtained.

Sometimes the coated product is not finished and ready to be packed—it may still be an intermediate, as after the spraying and drying process the coating may not be totally crystallized. In this case the intermediate is therefore removed from the coating apparatus and fed to a storing tank. Tempering air is supplied to the tank in order to get the product tempered or conditioned. The final crystallization takes place in the conditioning tanks only, and there the crunchiness of the product is created.

Significant improvements in the capacity of panning of gum pellets and the like products with polyols such as xylitol are achieved when high temperature panning conditions are optimised and the drying with drying air between sprayings is incomplete.

Two kinds of syrup (sealing and coating) are generally used in the coating procedure. The first type of syrup (sealing) contains more gum and has a multiple role: 1) to seal the core and slow/prevent moisture migration between core and coating and vice versa 2) to prevent the coating from being friable (i.e. stick the coating to the pellet firmly, so that it will not flake off) 3) make the coating more flexible 4) form a good base for the main coating coats.

The first syrup (sealing) is typically used until an increase in pellet weight of typically about 10 to 30% has been achieved, then the coating syrup is used to build up the remainder of the coat. However, as this coating is designed to protect and act as a "key" for the further coats, it is important that the pellets are well coated with this material before progressing to the coating syrup, and this is conventionally done visually or by "feel".

The syrups for a xylitol coating may, for instance, have a concentration of 72% (65% xylitol & 7% gum arabic) dry substance in the sealing syrup, and 74% (72% xylitol & 2% Gum Arabic) dry substance in the coating syrup. The syrup preferably contains about 40 to 80% xylitol on the total weight. It generally contains about 1–10% or more, up to about 20% of a gum such as Gum Arabic on the total weight The syrup may also contain other additives such as flavours, pigments, special sweeteners, active ingredients, etc. The additives should be chosen so as not to adversely affect the crystallization process. Some insoluble additives may even accelerate the crystallization by providing crystal growth centers.

In the high temperature xylitol coating of the present invention the syrup spraying temperature is generally maintained at 40 to 80° C., typically about 50° C. The chosen temperature will depend on the concentration of the syrup and the drying conditions.

In addition to pure xylitol coatings, the present invention is suitable for providing hard coatings from solutions containing also other dissolved and/or suspended polyols, especially special sweeteners such as lactitol, maltitol, mannitol, isomalt, sorbitol, etc.

The direction of the air flow during the period of high temperature drying is preferably direct, while it is often preferred to use a reverse flow when drying at a conventional temperature in the initial period and/or at the end of the coating. The direction of the flow of air may also be changed at other times during the coating procedure, for instance to alleviate dusting problems.

The temperature of the drying air may also be changed during the cycles themselves. Warm or hot air may be used in the beginning of the drying cycle and colder air during the end of the cycle, e.g. 1 to 2 minutes of warm/hot air and 1–2 minutes of cold/cool air.

The following examples illustrate coating according with the present invention using xylitol. The Examples should only be taken as illustrations of some embodiments of the invention and should in no way be considered as limiting the invention. It is obvious to a person skilled in the art that the industrial processes in question may be further optimized once the principles according to the invention are known.

EXAMPLES 1 to 6

Examples 1 to 3 were conducted on a batch size of 350 kg pellet centres, coated to a 50% weight increase. Examples 4 to 6 were conducted on a batch size 60 kg pellet centres, also coated to a 50% weight increase. The sealing syrup composition was xylitol 65%, gum arabic 7%, water 28%; the coating syrup composition was xylitol 72%, gum arabic 2%, water 26%.

The panning conditions, parameters and the process times are set out in Table 1.

TABLE 1

| Batch no: | 1600/4 | 1600/5 | 1600/3 | 1200/4 | 1200/5 | 1200/6 |
|---|---|---|---|---|---|---|
| Inlet air temp, ° C. | 22 | 40 | 35 | 35–48 | 36–60 | 35–68 |
| Outlet air temp. ° C. | 21 | 33 | 32 | 31–33 | 31–40 | 33–40 |
| Bed temp, ° C. | 22 | 35 | 30 | | 35 | 40 |
| Air direct/reverse | rev | dir | rev | rev | rev | rev |
| Product temp, ° C. | 21 | 32 | 30 | 27–31 | 28–35 | 32–39 |
| Dew point, ° CTP | 0–+1 | +1–+4 | +3–+4 | +4–+6 | +4–+7 | +4–+6 |
| Air flow, m³/h | 4500 | 4500 | 4500 | 1000 | 1000 | 1000 |
| Pressure diff, hPa | −2 | −2 | −2 | −2 | −2 | −2 |
| Syrup temp, ° C. | 50 | 50 | 50 | 50 | 50 | 50 |
| Drum speed, rpm | 9 | 9 | 9 | 8–10 | 8–10 | 8–10 |
| Process time, min | 292 | 188 | 202 | 213 | 177 | 150 |

The following comments pertain to each of the tests separately:

1. Batch 1600/4 Standard Process/Comparative Example

This batch followed the coating procedure used as a standard. The bed temperature was 22° C. As would be expected with a standard procedure this batch did not cause any difficulties during the processing. The batch took 292 minutes to process. This is comparable to the times obtained during previous scale-up trials for a standard batch.

On tasting the samples 2 weeks after production the pellets had a good gloss, with a smooth surface and little or no corner loss. The pellets had an acceptably crunchy coating.

2. Batch 1600/3

This trial was comparable to the standard procedure except for the raised temperature. The direction of the air flow was reverse as in the standard procedure. Some problems were noted with dusting during processing. The dust created a dusty surface on the surface of the pellets, which appeared to prevent the syrup application from drying properly.

The syrup appeared to be crystallizing rapidly giving rise to a rough surface. Due to the roughness a pause period had to be incorporated into the process. The degree of dusting in combination with the pause period caused a sticky period during the process. A number of multiples formed within the pan.

Despite the dusting the process was about 30% faster than the standard. The quality of the pellets was not as good as the standard.

3. Batch 1600/5

Direct air-flow was used in the process as opposed to the reverse air-flow utilized in the standard procedure. Direct air-flow reduces the effectiveness of the drying.

This batch followed an identical syrup dosage as applied during the standard batch. Changes were made during the processing whereby larger syrup applications could be made and drying times could be reduced significantly. Overall, this batch processed≈35% faster than the standard batch (188 minutes compared to 292 minutes for the standard). The batch also processed quicker than bath 1600/3.

The less efficient drying allowed a smoother coating to be applied and removed the need for pause periods during the process. On tasting the samples 2 weeks after production it was noted that these pellets had a smooth surface with little or no corner loss (as standard). These pellets had a good crunch, similar, if not slightly firmer, than the crunch obtained with the standard procedure.

Overall, the quality of the pellets remains as good, if not better, compared to the standard procedure. The process also offers a considerable time saving.

4. Batch 1200/4

This trial used lower initial syrup applications and a product temperature close to that desired (30° C.). The reduced syrup applications and increased product temperature appeared to resolve all of the problems previously encountered with sticking and multiple formation. In order to achieve the desired product temperature of 30° C. the drying air temperature had to be far higher at around 37° C. to 40° C.

The finished coating was very smooth and quite glossy. However, most of the pellets had well-rounded corners, a sign of abrasion during the process. The finished coating was crisp with a good crunch equal to the standard 5. Batch 1200/5

The product temperature was raised by 5° C., above that utilized for Trial 1200/4. The drying air temperature for this trial was set at a maximum of 45–48° C. for much of the process. Increasing the product temperature by 5° C. throughout this trial appeared to significantly reduce any problems associated with stickiness during the drying phases of the process, and to aid more rapid drying of the syrup coats. The more efficient drying of the syrup applications allowed total drying times to be reduced, resulting in a faster process than Trial 1200/4 (177 minutes versus 213 minutes).

The quality of the finished pellet coating did not appear to be effected by the changes in the protocol. The finished product had a slightly improved sheen over that observed for Trial 1200/4. Corner loss on the pellets was comparable between both batches. Crunchiness of the pellet coating was perhaps marginally superior to Trial 1200/4; otherwise there was little overall difference between the products.

6. Batch 1200/6

Working at this high temperature caused a number of processing difficulties with dusting and multiple formation. Despite this the finished product was very smooth although the surface finish was relatively dull. The products also exhibited significant corner loss.

The pellet crunch was not as crisp as that produced in trial 1200/4.

EXAMPLE 7

Control of Coating by Relative Humidity

A batch of chewing gum pellet centres were coated to a 50% weight increase with the same syrups as those used in Examples 1–6. The initial layers were produced with an inlet air temperature of about 30° C. whereafter the inlet air temperature was raised to 40° C. for the actual coating. The change in relative humidity (RH) of the outlet air was monitored at the increased temperature phase.

The relative humidity of the outlet air had a basic level of about 12% measured as the RH of the air in the outlet tube during the pause, during which the bed was by-passed. The RH of the outlet air was found to increase rapidly during the first 30 seconds of the drying, whereafter it decreased slowly as indicated in Table 2.

The next spraying cycle started well before the RH had reached the basic value of about 12%

TABLE 2

| | Relative humidity (%) of outlet air seconds after drying had started in the cycle. | | | | | |
|---|---|---|---|---|---|---|
| Phase | basic | 30 sec | 60 sec | 90 sec | 120 sec | 180 sec |
| 2 | 11.8 | 26.1 | 19.0 | | 14.5 | 13.4 |
| 5 | 12.7 | 30.0 | 22.2 | 17.4 | 15.5 | |
| 6 | 12.5 | 30.8 | | | 15.3 | |
| 7 | 12.1 | 31.2 | 27.0 | | 16.0 | |
| 8 | 12.1 | 31.0 | 27.0 | 20.4 | 17 | |

The drying sequence was between 2 and 3 minutes and the Table shows that some moisture that could have been dried off from the layer was intentionally left in the layer. By this control procedure the process could be speeded up considerably while ascertaining that the layer did not over-dry to a point where dusting would disturb the coating surface.

EXAMPLE 8

Control of Coating by Relative Humidity

Two batches of chewing gum pellets (10 kg) were coated in a Driacoater 500/600 Vario equipment with a syrup containing 65% xylitol and 7% gum arabic in the sealing syrup and 72% xylitol and 2% gum arabic in the coating syrup.

The outlet air RH was monitored during the process. The basic level for the RH of the outlet air was determined as the RH of the outlet air at the point at which the pellets were observed to be fully dried, and at which the RH of the air appeared to have reached a plateau.

The trigger point for the next -syrup application was set at a point when the desired difference between the observed RH of the outlet air and the predetermined basic RH level was reached, i.e. a point 1–10% RH above the basic level RH of the outlet air. For example, if the basic level RH of the outlet air was 30%, and the desired difference in RH was 5%, then when the next syrup application would be applied when the measured RH of the outlet air reached 35%.

The temperature of the drying air was raised after the sealing phase from 30° C. to 50° C. The change to RH control was made during phase 4 onwards. The RH of the outlet air was used to trigger syrup application when the RH was above its basic level.

Batch A set a target of applying the next syrup phase when the RH of the outlet air was −5% higher than the basic levels assessed in a previous trial with complete drying.

The batch progressed well with the addition of up to 5% RH to the basic level. During this batch the relative humidity of the inlet feed air was relatively high as the dew point in the air drier was monitored at −3° CTP. The batch was completed 32 minutes quicker than a standard trial.

Batch B intended to add 6+% to the basic level RH of the outlet air. The RH of the inlet air had changed to the dryer conditions of a dew point of −10° CTP. The RH of the outlet air dropped very rapidly in this batch. The coating time for the process was an improvement over the previous trial and coating times were reduced significantly compared to standard trials.

The target in Batch B was to apply the next syrup phase 6% higher. However, the test showed that this level could potentially be increased as the RH of the outlet air was dropping very rapidly. This indicated that with a lower RH of the inlet air the trigger point could be increased without having a detrimental effect on the coating quality.

What is claimed is:

1. A process for the production of chewable coated cores comprising the hard panning of chewable cores in a coating pan or drum wherein a syrup containing at least one of a crystallizable polyol, a crystallizable sugar or mixtures thereof is intermittently sprayed over a rotating bed of the cores and said cores are dried between sprayings with a flow of air, said cores being dried between sprayings by controlling effective parameters of said drying air selected from the group consisting of air humidity, air temperature, air flow speed, air flow time, air flow direction and any combination thereof and stopping said drying before the relative humidity of the outlet flow of drying air has reached its basic level at which its gradient has flattened to a plateau, so as to cause a substantial residual moisture to remain in the drying coating layer at the start of a subsequent spraying phase.

2. A process according to claim 1, wherein said parameters comprise the relative humidity of said drying air at an outlet of said pan or drum.

3. A process according to claim 1 or 2, wherein said parameters comprise the temperature of said drying air at an inlet of said pan or drum.

4. A process according to claim 2, wherein the relative humidity of the outlet air when starting said subsequent spraying is higher than the basic relative humidity level.

5. A process according to claim 1, wherein a number of coating cycles is performed, each coating cycle comprises a syrup application phase, an optional pause phase and a drying phase.

6. A process according to claim 2, wherein the flow of drying air to said bed is stopped before the drying is completed and the relative humidity of the outlet air is 1–10 percentages higher than its basic level.

7. A process according to claim 5, wherein the direction of the air during at least a part of said drying phases is direct with the air flowing from above the bed through the product.

8. A process according to claim 1, wherein the coating syrup contains about 40 to 80% of the total weight of a polyol selected from the group consisting of xylitol, sorbitol, maltitol, isomalt and mixtures thereof.

9. A process according to claim 8, wherein the polyol is xylitol.

10. A process according to claim 9, wherein the temperature of the bed of chewable cores is adjusted to a temperature of 25 to 45° C. for at least a part of the total coating procedure, and the drying during said part of the procedure is performed with air having an inlet temperature of 25 to 75° C.

11. A process according to claim 10, wherein the bed temperature is 33 to 40° C.

12. A process according to claim 10, wherein the inlet temperature is 40 to 50° C.

13. A process according to claim 10, wherein the coating syrup temperature is 40 to 80° C.

14. A process according to claim 1, wherein the coating syrup contains about 40 to 80% of the total weight of a sugar selected from the group consisting of saccharose, fructose and glucose.

15. A process according to claim 1, wherein the coating syrup contains 1 to 20% of gum of the total weight.

16. A process according to claim 8, wherein the coating syrup comprises other polyols, flavors, pigments, special sweeteners, insoluble additives or mixtures thereof.

17. A process according to claim 1, wherein the coating syrup contains dissolved, suspended or dissolved and suspended xylitol, sorbitol, lacitol maltitol, isomalt, mannitol or mixtures thereof.

18. A process according to claim 1, wherein the coating of the chewable cores is started by an initial sequence having a bed temperature lower than the bed temperature during the residual moisture retaining drying procedure.

19. A process according to claim 1, wherein the coating of the chewable cores is finished by an end coating sequence having a bed temperature lower than the bed temperature during said residual moisture retaining drying procedure.

20. A process according to claim 18 or 19, wherein the direction of the flow of air during the initial coating, the end coating or both coatings is reversed such that the air flows from below the bed through the product.

21. A process according to claim 1, wherein the direction of the air flow, the air flow speed, the air flow time, the temperature of the air or any combination thereof is changed during the coating procedure.

22. A process according to claim 1, wherein the cores are coated with syrup until a desired coating thickness is provided and the coated cores are tempered after the coating for a time sufficient to allow crystallization of the polyol or sugar in said coating to provide a crunchy hard coating.

23. A process according to claim 1, wherein said core comprises chewing gum.

24. A process according to claim 6, wherein the relative humidity of the outlet air is more than 3 percentages higher than its basic level.

25. A process according to claim 6, wherein the relative humidity of the outlet air is 4–8 percentages higher than its basic level.

26. A process according to claim 10, wherein the temperature of the bed is adjusted to a temperature of from 30 to 40° C. and said inlet temperature is from 30 to 65° C.

27. A process according to claim 15 wherein the gum is Gum Arabic.

28. A process for the production of chewable coated cores by hard panning comprising:

spraying a syrup containing at least one of a crystallizable polyol, a crystallizable sugar and combinations thereof over a rotating bed of chewable cores in a coating pan or drum;

stopping said spraying of said rotating cores while continuing rotation;

starting to dry said cores with an inlet flow of air;

controlling the drying of said rotating cores by controlling effective parameters of the drying air selected from the group consisting of air humidity, air temperature, air flow speed, air flow time, air flow direction and any combination thereof;

stopping said flow of drying air at a point before the relative humidity of the outlet flow of said drying air has reached its basic level at which its gradient has flattened to a plateau indicating that a substantial residual moisture remains in the drying coating layer;

starting a subsequent spraying phase by spraying said syrup onto the moisture containing layer of the previous spraying phase; and repeating the spraying and drying of said rotating cores until a predetermined coating has been provided.

* * * * *